United States Patent
Masuda et al.

(10) Patent No.: US 9,347,781 B2
(45) Date of Patent: May 24, 2016

(54) TERMINAL DEVICE AND GUIDANCE PROGRAM

(71) Applicant: AISIN AW CO., LTD., Anjo-shi, Aichi-ken (JP)

(72) Inventors: Hiroyoshi Masuda, Kasugai (JP); Yohei Ando, Kasugai (JP); Yusuke Oohashi, Sapporo (JP)

(73) Assignee: AISIN AW CO., LTD., Aichi-ken (JP)

( * ) Notice: Subject to any disclaimer, the term of this patent is extended or adjusted under 35 U.S.C. 154(b) by 0 days.

(21) Appl. No.: 14/406,246

(22) PCT Filed: Mar. 15, 2013

(86) PCT No.: PCT/JP2013/057408
§ 371 (c)(1),
(2) Date: Dec. 8, 2014

(87) PCT Pub. No.: WO2014/020934
PCT Pub. Date: Feb. 6, 2014

(65) Prior Publication Data
US 2015/0149075 A1   May 28, 2015

(30) Foreign Application Priority Data
Jul. 30, 2012  (JP) ................. 2012-168415

(51) Int. Cl.
*G01C 21/12* (2006.01)
*G01C 21/34* (2006.01)
(Continued)

(52) U.S. Cl.
CPC ............... *G01C 21/34* (2013.01); *G01C 21/30* (2013.01); *G09B 29/106* (2013.01)

(58) Field of Classification Search
CPC .......... G01C 21/12; G01C 21/20; G01C 21/30
See application file for complete search history.

(56) References Cited

U.S. PATENT DOCUMENTS

| | | |
|---|---|---|
| 2011/0231089 A1 | 9/2011 | Ikeuchi et al. |
| 2012/0232793 A1 | 9/2012 | Hagiwara et al. |

FOREIGN PATENT DOCUMENTS

| | | |
|---|---|---|
| JP | 5-312933 A | 11/1993 |
| JP | 8-83398 A | 3/1996 |

(Continued)

OTHER PUBLICATIONS

Communication dated Jul. 16, 2015, issued by the European Patent Office in counterpart Application No. 13825799.3.
(Continued)

*Primary Examiner* — Michael D Lang
(74) *Attorney, Agent, or Firm* — Sughrue Mion, PLLC (57) ABSTRACT

A navigation device includes a GPS receiver, map data including tunnel data and periodically acquires a vehicle's speed to provide guidance on the current position N acquired at the GPS receiver, and when GPS radio waves become unreceivable after the vehicle passes a tunnel entrance, calculates a travel distance according to a vehicle speed and a time T up to a branch, and continues providing guidance on the current position up to the branch. After passing the branch, the navigation device suspends guidance, calculates a distance La between the branch and a tunnel exit, which is shorter, and when GPS radio waves are not received even after a movement distance from the branch exceeds distance La, after passing the branch, determines a road whose distance is longer as the road being traveled, and provides guidance on the current position.

19 Claims, 4 Drawing Sheets (51) Int. Cl.
  *G01C 21/30* (2006.01)
  *G09B 29/10* (2006.01)

(56) References Cited

FOREIGN PATENT DOCUMENTS

| JP | 2003-322534 A | 11/2003 |
| JP | 2006-293435 A | 10/2006 |
| JP | 2007101379 A | 4/2007 |
| JP | 2010-190832 A | 9/2010 |
| JP | 2011-117739 A | 6/2011 |
| JP | 2012127845 A | 7/2012 |
| WO | 2011105264 A1 | 9/2011 |

OTHER PUBLICATIONS

International Search Report for PCT/JP2013/057408 dated Jun. 18, 2013.

TERMINAL DEVICE AND GUIDANCE PROGRAM

CROSS REFERENCE TO RELATED APPLICATIONS

This application is a National Stage of International Application No. PCT/JP2013/057408 filed Mar. 15, 2013, claiming priority based on Japanese Patent Application No. 2012-168415 filed Jul. 30, 2012, the contents of all of which are incorporated herein by reference in their entirety.

TECHNICAL FIELD

The present specification relates to a terminal device and a guidance program, for example, relates to a technology that provides guidance corresponding to a current position that is acquired by receiving radio waves from GPS satellites.

BACKGROUND ART

Navigation devices that acquire a current position and provide various kinds of guidance have been widely used.

Such navigation devices come in a variety of forms, such as a navigation device provided exclusively for vehicle, a navigation device that is realized by incorporating a navigation function as one function into various kinds of terminal devices such as a smart phone, etc.

Navigation devices in such variety of forms are common in an aspect of, in order to acquire a current position, including a GPS receiver that receives radio waves from GPS satellites (hereinafter, referred to as GPS radio waves) and acquiring the current position on the basis of the received GPS radio waves.

However, in case of acquiring the current position only using GPS radio waves, the current position cannot be acquired in blocking areas, in which GPS radio waves are not receivable, for example, in tunnels, in buildings' shadow, under bridges, etc. Therefore, navigation devices incorporated into vehicles are configured to be able to continuously acquire the current position by further supplementarily using a vehicle speed sensor, a gyro sensor, a geomagnetic sensor, etc.

For example, Patent Document 1 describes a technology that, in a case in which positioning by a GPS becomes unable, acquires the current position in tunnels with a simple configuration in which only a speed sensor is utilized without a directional sensor, while in a conventional technology, the current position is acquired by a dead reckoning system using a vehicle speed sensor and a directional sensor.

In such a manner, navigation devices capable of utilizing the vehicle speed in addition to a GPS can estimate the current position in tunnels using the vehicle speed and time in a case in which the tunnels have only one exit.

However, in a case in which a tunnel has a branch and therefore there are two or more exits, it is not possible to determine the road on which the vehicle is traveling after passing the branch.

On the other hand, in case of navigation devices whose functions are realized by various kinds of terminals such as smart phones that are used independently from the vehicle, neither a direction nor a vehicle speed can be utilized. Therefore, the current position cannot be determined in tunnels regardless of whether a branch exists or not.

In addition, some vehicles include a function that provides the vehicle speeds to terminal devices with or without wires. However, even when the vehicle speeds are acquired from those vehicles, it is not possible to determine a road on which each vehicle travels after passing a branch in a tunnel, as is the case in Patent Document 1.

RELATED ART DOCUMENT

Patent Document

Patent Document 1: Japanese Patent Application Publication No. 5-312933 (JP 5-312933 A)

SUMMARY OF THE INVENTION

It is an object to make it possible, in a case in which a traveling road has a branch in a blocking area such as a tunnel in which radio waves from GPS satellites are not receivable, to determine the road being traveled after passing the branch.

Means for Solving the Problem

An exemplary embodiment provides a terminal device that provides guidance corresponding to a current position on map data, in which by including: map data storage for storing the map data; current position acquiring device for receiving radio waves from GPS satellites and acquiring a current position on the map data; blocking area acquiring device for acquiring a blocking area in which radio waves from the GPS satellites are not receivable, the blocking area corresponding to the map data; guidance device for providing guidance corresponding to the current position, and in a case in which the terminal device is moving on a road in the blocking area and the road has a branch, suspends the guidance corresponding to the current position; physical amount estimating device for estimating a physical amount in the blocking area, the physical amount being convertible to a movement distance; and movement road determining device for determining a road on which the terminal device is moving after the branch in the blocking area, on the basis of the estimated physical amount and a reception condition of radio waves from the GPS satellites.

According to another embodiment, the guidance device, in a case in which radio waves from the GPS satellites are received during the guidance being suspended, terminates the guidance suspension and resumes the guidance corresponding to the acquired current position.

According to another embodiment, the terminal device includes shortest leaving physical amount acquiring device for acquiring a shortest leaving physical amount to leaving, with respect to a shortest road through which the terminal device leaves the blocking area fastest in a case in which the terminal device travels on each road ahead of the branch, wherein the movement road determining device, in a case in which the estimated physical amount exceeds the shortest leaving physical amount and radio waves from the GPS satellites are not received, determines a road that is not the shortest road as the road on which the terminal device is traveling after the branch.

According to another embodiment, the terminal device is provided so that the guidance device terminates the guidance suspension, estimates as the current position a position that is on the determined road and corresponds to the estimated physical amount, and provides guidance corresponding to the estimated current position.

According to another embodiment the terminal device is installed in a vehicle, the blocking area acquiring device acquires an area in a tunnel as the blocking area, the physical amount estimating device estimates a movement distance as a physical amount in the blocking area, and the shortest leaving physical amount acquiring device acquires a shortest leaving distance to an exit of the tunnel as the shortest leaving physical amount.

According to another embodiment, the terminal device includes a vehicle speed acquiring device for acquiring a vehicle speed from the vehicle, wherein the physical amount estimating device estimates the movement distance on the basis of the vehicle speed acquired from the vehicle and a movement time in the tunnel.

According to another embodiment, the terminal device is installed in a vehicle, and the blocking area acquiring device acquires an area in a tunnel as the blocking area and includes prescribed vehicle speed acquiring device for acquiring a prescribed vehicle speed that is previously prescribed for the tunnel, the physical amount estimating device acquires a movement time in the tunnel as the physical amount, and the shortest leaving physical amount acquiring means acquires a shortest leaving time to an exit of the tunnel on the basis of the acquired prescribed vehicle speed as the shortest leaving physical amount.

According to another embodiment, the terminal device includes a congestion information acquiring device for acquiring congestion information, wherein the guidance device continues the guidance suspension in the tunnel in a case in which congestion information in the tunnel is acquired.

According to another embodiment, a guidance program for a terminal device that provides guidance corresponding to a current position on map data, in which a computer is operable to execute: current position acquiring function of receiving radio waves from GPS satellites and acquiring the current position on the map data; blocking area acquiring function of acquiring a blocking area in which radio waves from the GPS satellites are not receivable, the blocking area corresponding to the map data; guidance function of providing guidance corresponding to the current position, and in a case in which the terminal device is moving on a road in the blocking area and the road has a branch, suspending the guidance corresponding to the current position; physical amount estimating function of estimating a physical amount in the blocking area, the physical amount being convertible to a movement distance; and movement road determining function of determining a road on which the terminal device is moving after the branch in the blocking area, on the basis of the estimated physical amount and a reception condition of radio waves from the GPS satellites.

By estimating a physical amount Lm in a blocking area that is convertible to a movement distance, it is possible, without determining a direction, to determine a road being traveled after passing a branch in the blocking area on the basis of the estimated physical amount Lm and a reception condition of radio waves from GPS satellites.

PREFERRED EMBODIMENTS

Hereinafter, a terminal device and a guidance program according to an embodiment are explained with use of a navigation device and a navigation program as an example.

(1) Summary of Embodiment

A navigation device according to the present embodiment includes a GPS receiver and map data containing tunnel data as blocking areas. In addition, the navigation device is allocated in a vehicle and periodically acquires a vehicle speed from the vehicle with or without wires.

Figure 1:
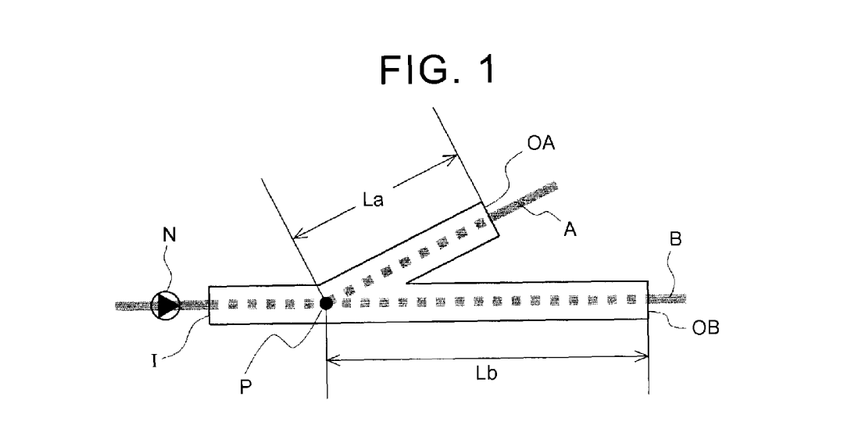
FIG. 1 illustrates an exemplary case in which a traveling road in a tunnel including a branch is determined.

The navigation device, as shown in FIG. 1, provides guidance on a current position N that is acquired by the GPS receiver when GPS radio waves are receivable.

When the vehicle passes a tunnel entrance I and GPS radio waves become unreceivable, the navigation device calculates, until arriving at a branch P in the tunnel, a travel distance L from the tunnel entrance I on the basis of the vehicle speed acquired from the vehicle and a time T passed from the time point when GPS radio waves become unreceivable and continues to provide guidance on the current position N between the tunnel entrance I and the branch P in the tunnel.

After passing the branch P, the navigation device suspends the guidance and does not move the display of the current position by fixing the display of the current position at the branch P or displaying the current position in a different display mode (display in a light color, display in a flashing mode, etc.).

On the other hand, the navigation device calculates a distance (La in FIG. 1) between the branch P and a tunnel exit of a road A or a road B, which is shorter.

In a case in which GPS radio waves continue unreceivable after a movement distance from the branch P exceeds La, the navigation device determines, as a road being traveled after passing the branch, the road B whose distance to the tunnel exit is longer.

By determining the traveling road B and, for example, displaying the road B in a particular color, the user can recognize the road on which the vehicle is currently traveling.

After passing the branch P, the navigation device does not cause the display of the current position N to move from the branch P. However, by calculating a provisional position Na on the road A and a provisional position Nb on the road B corresponding to the movement distance from the tunnel entrance I, when GPS radio waves are received, it becomes possible to immediately display the current position N either at a tunnel exit OA or at a tunnel exit OB prior to determining the current position on the basis of the received GPS radio waves. In such a case, regarding the position to display the current position N between at the tunnel exit OA and at the tunnel exit OB, the navigation device displays the current position N at the tunnel exit OA in a case in which GPS radio waves are received at the movement distance La from the tunnel entrance I, and displays at the tunnel exit OB in a case in which GPS radio waves are received at the movement distance Lb.

In the present embodiment, it is possible to determine the road B as the road being traveled after passing the branch. Therefore, the calculation of the provisional position Na becomes unnecessary and only the calculation of the provisional position Nb is necessary. Thus, the calculation process load can be reduced.

In the present embodiment, by determining the road B, it is possible to display the current position mark N indicating the current position at the provisional position Nb on the determined road B. Specifically, it is possible to resume, in the tunnel, the guidance that was suspended at the branch P.

(2) Details of Embodiment

Figure 2:
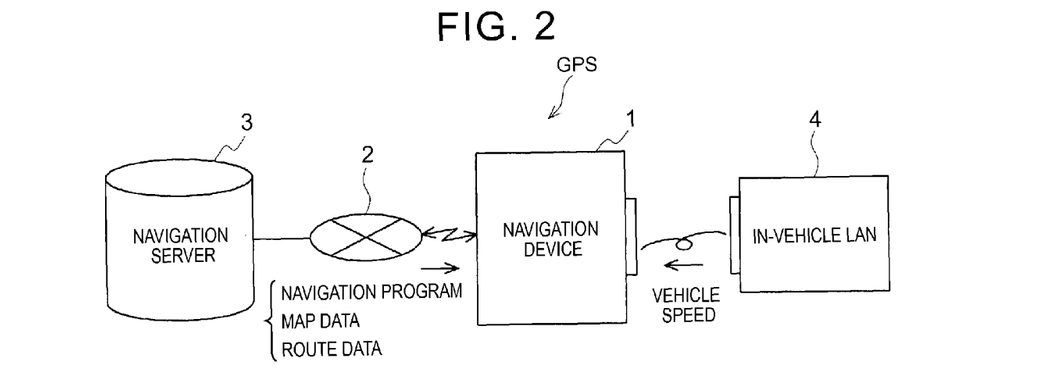
FIG. 2 is a system block diagram of a navigation system.

FIG. 2 shows a system structure of a navigation system in which a terminal device is utilized as a navigation device.

As shown in FIG. 2, the navigation system includes a navigation device 1, a network 2, a navigation server 3, and an in-vehicle LAN 4.

The navigation device 1 may be configured by a terminal device according to the present embodiment, such as a smart phone, a cellular phone, a PDA (Personal Digital Assistant), a laptop personal computer, etc.

The network 2 may be various kinds of networks such as an Internet, through which various kinds of communications are performed between the navigation device 1 and the navigation server 3.

The navigation server 3 performs various kinds of processes relating to navigation functions, and also provides the navigation device 1 through the network 2 with a guidance program, data, and information to realize the navigation functions.

The navigation device 1 connects with the network 2 with or without wires and downloads the guidance program and map data from the navigation server 3. The navigation device 1 can make a calculation request for a travel route to a destination by sending the current position and a destination to the navigation server 3 and receive travel route data as a calculation result.

The navigation device 1 is capable of downloading the guidance program, map data, and the like to realize these navigation functions from various kinds of server (for example, a shop server) that is connectable through the network 2, besides the navigation server 3.

In addition, the guidance program and the map data may be downloaded and stored, or previously incorporated into the terminal device.

The navigation device 1 is capable of determining an absolute position (latitude and longitude) by receiving radio waves from GPS satellites, and acquiring the current position on the map data.

In addition, for guidance performed by the downloaded guidance program, the navigation device 1 can be utilized while walking. Alternatively, the navigation device 1 may be allocated and utilized on a bicycle, a motorbike, etc., or in a vehicle.

In the present embodiment, a case is described, in which the navigation device 1 is allocated and utilized in a vehicle.

In addition, some vehicles may be configured to supply vehicle speed data by wireless or via communication. The vehicle in the present embodiment is provided with a terminal to connect with a portable terminal through the in-vehicle LAN 4 such that vehicle speed data is periodically (for example, once a minute) supplied from the terminal.

The navigation device 1, when allocated in a vehicle, acquires the vehicle speed supplied from the in-vehicle LAN 4 and calculates the movement distance.

Figure 3:
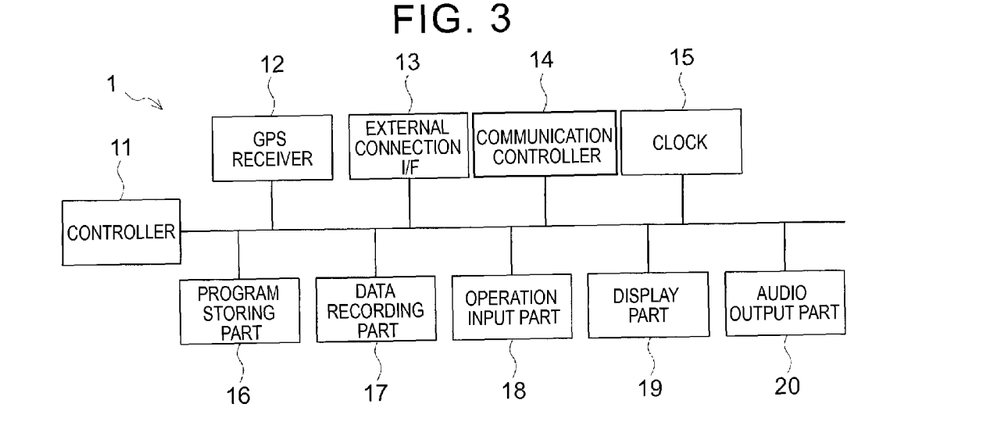
FIG. 3 is a block diagram of a navigation device.

FIG. 3 shows the structure of the navigation device 1.

The navigation device 1 includes a controller 11, a GPS receiver 12, an external connection interface (I/F) 13, a communication controller 14, a clock 15, a program storing part 16, a data recording part 17, an operation input part 18, a display part 19, an audio output part 20, and the like.

The controller 11 includes a CPU, a ROM, and a RAM and performs various kinds of control in accordance with various kinds of programs that are stored in the ROM or the program storing part 16.

For example, to realize the navigation functions according to the present embodiment, the controller 11, in accordance with a guidance program, acquires the current position of the vehicle (portable terminal), provides guidance corresponding to the acquired current position, determines a traveling road after passing a branch in a tunnel, and provides guidance on the current position on the determined traveling road.

In addition, the controller 11, in accordance with various kinds of basic programs stored in the ROM, connects with the network 2, receives programs and data from various kinds of servers and displays the received image data on the display part 19.

The GPS receiver 12 receives radio waves from GPS satellites to obtain the absolute position (latitude and longitude) of a device and acquires the current position on the map data. Note that the process in a case in which the current position on the map data is acquired from the obtained absolute position may be performed by the controller 11, in accordance with the guidance program. However, in the present embodiment, a case in which the GPS receiver 12 performs such a process is exemplified.

The external connection I/F 13 is an interface to connect with various kinds of external devices such as a personal computer, etc. In the present embodiment, the external connection I/F 13 is connected with the in-vehicle LAN 4.

The communication controller 14, which is a device to connect with external devices via communication, controls audio communication when realizing telephone functions and connection with the network 2.

The clock 15 is configured, for example, using a crystal oscillator. The clock 15 counts time and supplies operation timing of each part of the navigation device 1 with oscillation. In addition, the clock 15 may be incorporated into the controller 11.

The program storing part 16 stores programs to realize various kinds of functions of the navigation device 1 (terminal device). For example, programs to realize various functions such as a portable phone function, a browse function by Internet, a voice recognition function, a navigation function are previously incorporated, or downloaded and stored in the program storing part 16.

In the present embodiment, a guidance program is stored in the program storing part 16 and a navigation process and a tunnel guidance process that are described later are performed by executing the program.

The data recording part 17 stores data received from an external portion, various kinds of data including information inputted by a user, map data according to the present embodiment.

The map data includes, as various kinds of data necessary for map display, route calculation, route guidance in navigation, map data, road data, information of tunnels as blocking areas, and other data. The map data may further include guidance point data and detailed destination data to provide guidance on facilities in accordance with the navigation functions.

In addition, the navigation device 1 in the present embodiment includes a route calculation function and a guidance function of facilities etc. However, in a case in which the route calculation function is not included, the navigation device 1 may send the current position and a destination to the navigation server 3 and acquire a travel route calculated in the navigation server 3. Using the travel route calculated in the host device or the acquired travel route, the guidance on the travel route (guidance for a straight advance and a left/right turn, and guidance for lane change by audio and by screen display) may be performed while matching between the current position and the travel route is performed.

In addition, in a case in which the guidance function of facilities, etc. is not included, the current position may be sent to the navigation server 3 and facility data of the vicinity of the current position may be received and displayed on a screen. In such a case, the travel route received from the navigation server 3 is stored in the RAM of the controller 11 or in the data recording part 17.

The road data included in the map data is data regarding roads such as a position, a type, and a number of lanes of each road, and a connection relation between roads, and includes node data and link data. The road data is utilized for route calculation and map matching as well as when displaying the calculated travel route over the map data or displaying the acquired current position on the map data (road data).

The tunnel information included in the map data includes, corresponding to each road forming the map data, information of an entrance and an exit of a tunnel (specified by node data in road data), presence or absence of a branch, a distance from the entrance to the branch, a distance from the branch to each exit, etc.

In a case in which the tunnel information only includes information regarding entrances and exits, the controller 11 calculates distances between nodes that are specified by the information regarding entrances and exits of tunnels from the link data.

The operation input part 18 includes, for example, a touch panel, a touch switch, a key switch, and the like. Through user's operations, data inputs and instructions corresponding to various kinds of screens are performed. In a case in which the operation input part 18 includes an audio input function, a telephone function, a recording function, and a voice recognition function, a microphone for audio input are provided in the operation input part 18, although not specifically indicated.

The display part 19 may be configured by various kinds of display devices such as a liquid crystal display panel, a plasma display, and the like. The image data stored in the data recording part 17, a display screen by the browse function, the map data and the current position by the navigation functions according to the present embodiment, etc. are displayed on the display part 19. In addition, when travel route guidance is performed, the travel route is also displayed.

The audio output part 20 includes a speaker. The audio output part 20 outputs music and communication audio by the telephone function, and outputs audio guidance for the current position in the navigation function and for performing travel route guidance in some cases.

A navigation process by the navigation device 1 configured as above is described with reference to FIGS. 4 to 6.

Figure 4:
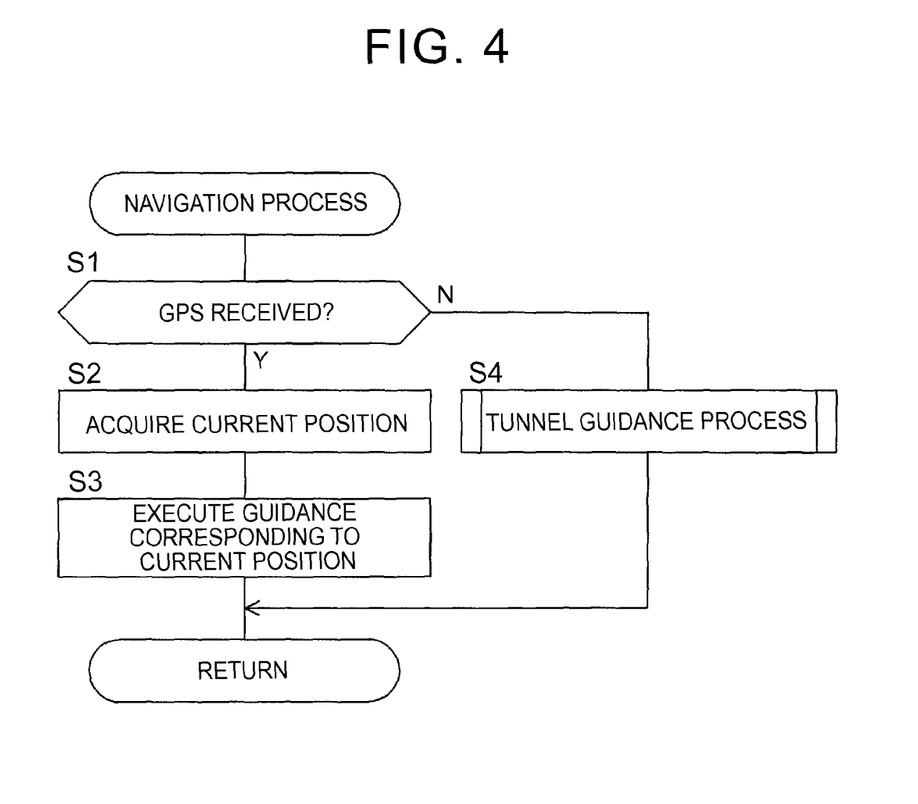
FIG. 4 is a flow chart illustrating the contents of a navigation process.

FIG. 4 is a flow chart illustrating the contents of the navigation process according to the present embodiment. FIG. 5 is a flow chart illustrating a tunnel guidance process in the navigation process. In addition, FIG. 6 illustrates transition states of a guidance screen inside and outside the tunnel. Note that, in the guidance screen in FIG. 6, the names of roads A and B, the indication of the distances La and Lb, etc. are displayed in order to explain the contents of the tunnel guidance process. However, these are not displayed in an actual screen.

Figure 6:
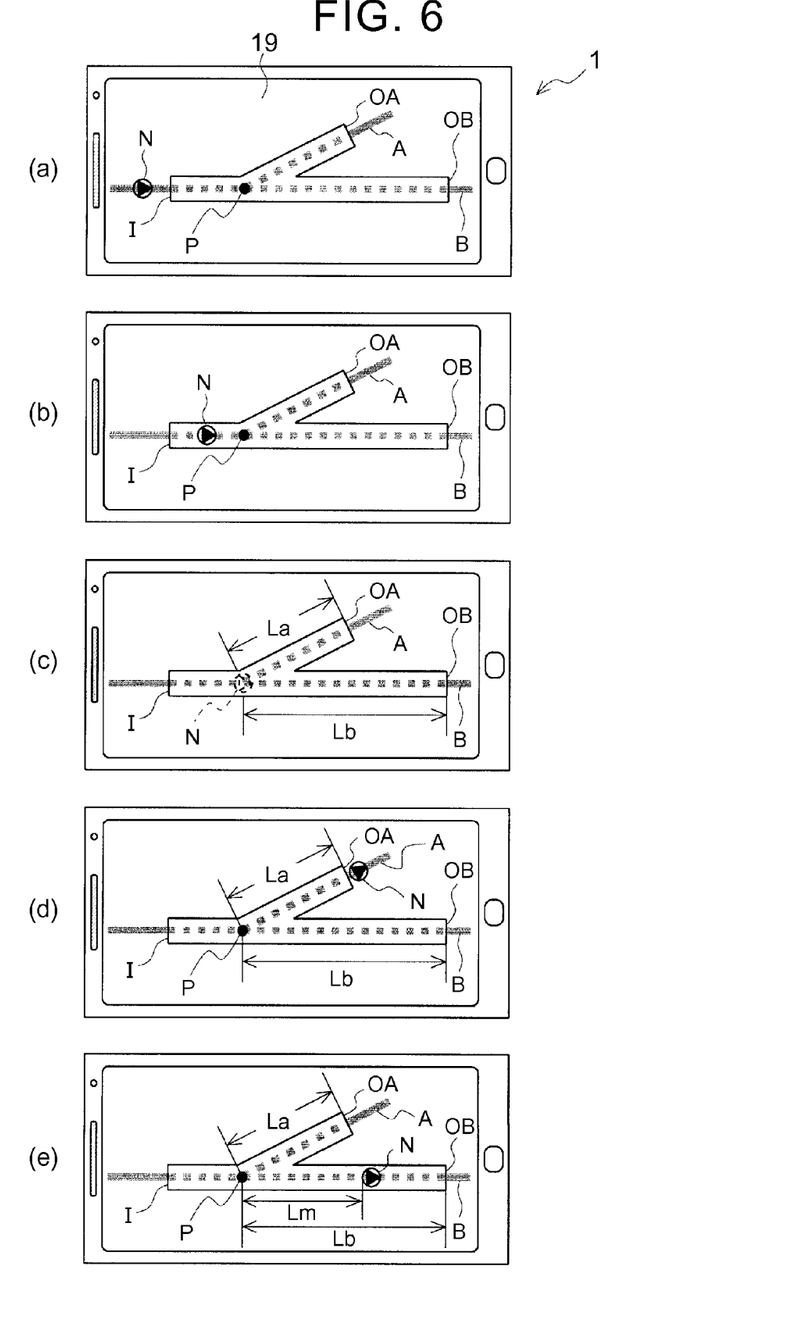
FIG. 6 illustrates transition states of a guidance screen inside and outside the tunnel.

In FIG. 6, the image is displayed such that the travel direction is the right direction for convenience of explanation. However, the travel direction may be upward in relation to the screen or the north may be displayed upward in relation to the screen, in the same manner as the map displays in common navigation functions.

The navigation process is executed by the controller 11 when the guidance program stored in the program storing part 16 is activated through an operation of the operation input part 18.

The controller 11 determines whether GPS radio waves are receivable at the GPS receiver 12 (Step 1).

In a case in which GPS radio waves are receivable (Step 1: Y), the controller 11 acquires the current position on the map data from the GPS receiver 12 to store in the RAM (Step 2), provides guidance corresponding to the acquired current position (Step 3), and returns.

As the guidance corresponding to the current position, the controller 11 reads out the map data corresponding to the current position from the data recording part 17 and displays the read map data on the display part 19, and also displays the current position mark N on the road corresponding to the current position through map matching. Note that the map data shown in FIG. 6 is the data including the tunnel shown in FIG. 1.

On the other hand, in a case in which GPS radio waves are not receivable (Step 1: N), the controller 11 performs the tunnel guidance process (Step 4).

Figure 5:
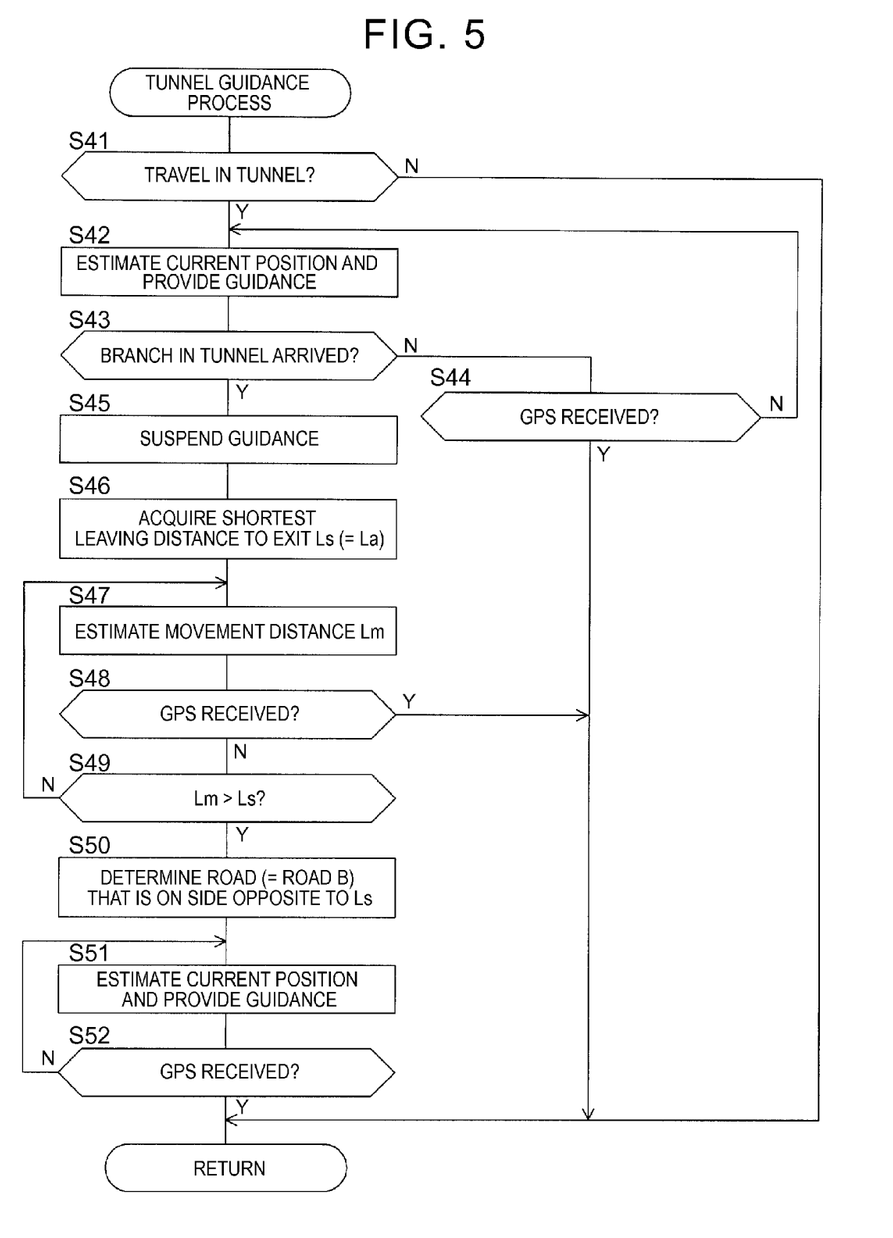
FIG. 5 is a flow chart illustrating the contents of a tunnel guidance process in the navigation process.

In the tunnel guidance process shown in FIG. 5, the controller 11 determines whether the vehicle is traveling inside a tunnel (Step 41). That is, the controller 11 determines whether a tunnel exists ahead of the current position (stored in the RAM) that was acquired from the GPS receiver 12 just before GPS radio waves become unreceivable.

In a case in which the vehicle is not traveling inside a tunnel (Step 41: N), the controller 11 determines that the vehicle is temporally in a state in which GPS radio waves are unreceivable due to buildings or the like, and returns to a main routine.

On the other hand, in a case in which the vehicle is traveling inside a tunnel (Step 41: Y), the controller 11 estimates the current position and provides guidance by displaying the current position mark N indicating the estimated current position on the map data displayed on the display part 19, as shown in FIG. 6B (Step 42).

Here, the controller 11 calculates the travel distance L from the tunnel entrance I as the current position of the vehicle, estimates the point at the travel distance L as the current position, and displays the current position mark N at the estimated position. The controller 11 calculates the travel distance L from the tunnel entrance I on the basis of the vehicle speed that is periodically transmitted from the in-vehicle LAN 4 and the time period that has passed after entering the tunnel.

Subsequently, the controller 11 determines whether the vehicle has arrived at the branch P in the tunnel (Step 43). Namely, the controller 11 calculates a distance to the branch P existing inside the tunnel that is being traveled from the map data and determines whether the calculated movement distance L reaches the distance to the branch P.

In a case in which there is no branch in the tunnel, the controller 11 determines at Step 43 that the vehicle has not arrived at the branch.

In a case in which the vehicle has not arrived at the branch P (Step 43: N), the controller 11 determines whether GPS radio waves have been received (Step 44).

This is to give priority to the current position acquired from the GPS receiver 12 in a case in which radio waves have been received. In a case in which radio waves have been received (Step 44: Y), the controller 11 returns to the main routine.

On the other hand, in a case in which GPS radio waves have not been received (Step 44: N), the controller 11 returns to Step 42 and continues the estimation of the current position and the guidance.

Thereby, the controller 11 continues the estimation of the current position and the guidance (Step 42) until the vehicle arrives at the branch P existing in the tunnel, or until the vehicle arrives at the tunnel exit in a case in which there is no branch P in the tunnel (Step 42), and the current position mark N of the vehicle moves along with the estimated current position in the travel direction, as shown in FIG. 6B.

When the estimated current position of the vehicle arrives at the branch P in the tunnel (Step 43: Y), the controller 11 suspends the guidance because the vehicle position after the branch is unknown (Step 45).

Namely, the controller 11 suspends the movement of the current position mark N from the branch P. In such a case, in order to make it clear that the guidance by displaying the estimated current position is suspended, the controller 11 displays the current position mark N in a different manner. For example, the current position mark N is displayed in a dotted line, as shown in FIG. 6C, displayed in a lighter color compared to during guidance, or displayed flashing.

On the other hand, the controller 11 acquires a shortest leaving distance Ls (La in the example shown in FIG. 6) to the tunnel exit as a shortest leaving physical amount to leaving, with respect to a shortest road through which the vehicle leaves the blocking area fastest (Step 46).

Namely, the controller 11 acquires the distances La and Lb that are from the branch P to the tunnel exits OA and OB of the respective roads A and B from the tunnel information regarding the tunnel being currently traveled and acquires the distance La that is shorter between the distances La and Lb as the shortest leaving distance Ls.

Note that the acquisition of the shortest leaving distance Ls may not be performed at the timing described above, and may be performed at an earlier timing, for example, at a time when the vehicle enters the tunnel.

In addition, in the present embodiment, the shortest leaving distance Ls to the tunnel exit is defined using the branch P in the tunnel as a start point. However, the start point may be the tunnel entrance I.

Subsequently, the controller 11 estimates a movement distance Lm having the start point at the start point utilized at Step 46 (branch P in the present embodiment) (Step 47).

The controller 11 determines whether GPS radio waves have been received (Step 48). In a case in which GPS radio waves have been received (Step 48: Y), the controller 11 returns to the main routine to give priority to the current position acquired at the GPS receiver, in the same manner as at Step 44.

In a case in which GPS radio waves have not been received (Step 48), the controller 11 compares the estimated movement distance Lm with the shortest leaving distance Ls (Step 49).

In a case in which the estimated movement distance Lm is less than or equal to the shortest leaving distance Ls (Step 49: N), the controller 11 returns to Step 47 because both the road A and the road B can be the road currently being traveled.

Thereafter, in a case in which GPS radio waves have been received at Step 48 (Step 48: Y), the controller 11 determines that the vehicle has left the tunnel on the side of the shortest leaving distance Ls and returns to the main routine. Then, at Step 4 of the main routine, the current position mark N acquired at the GPS receiver 12 is displayed ahead of the tunnel exit OA on the side of the road A, as shown in FIG. 6D.

Because GPS radio waves have not been received so far, it may take time to acquire the current position at the GPS receiver 12. Therefore, in a case in which GPS radio waves have been received, the current position mark N may be immediately displayed at a position just ahead of the tunnel exit OA. Thereby, a display lag of the current position mark N can be avoided.

In addition, the reception condition of GPS radio waves may not be favorable in the vicinity of the tunnel exit. Therefore, a distance Lx which ensures the reception of GPS radio waves after leaving the tunnel exit may be included in the shortest leaving distance Ls.

On the other hand, in a case in which the estimated movement distance Lm exceeds the shortest leaving distance Ls (Step 49: Y), the controller 11 determines that there is not possibility that the road A on the side of the shortest leaving distance Ls is being traveled and determines the road B on the opposite side of the shortest leaving distance Ls as the road currently being traveled (Step 50).

In the present embodiment, upon determining the road B, the controller 11 terminates the suspension of the guidance, estimates the current position on the basis of the vehicle speed and the time, and resumes the guidance by displaying the current position mark N at the estimated current position (Step 51).

Thereby, as shown in FIG. 6E, the guidance by displaying the current position mark N is resumed on the determined road B subsequent to the movement distance Lm from the branch P and the guidance using the estimated current position continues until GPS radio waves are received (Step 52: N).

On the other hand, in a case in which GPS radio waves are received during the guidance on the determined road B (Step 52: Y), the controller 11 determines that the vehicle has left the tunnel exit OB and returns to the main routine.

In the present embodiment, after the road B is determined (Step 50), the guidance is provided by displaying the current mark N at the estimated current position on the road B. However, neither the estimation of the current position on the road B nor the map display of the current position mark N may be performed. That is, the current position mark N may be fixed at the branch P.

In such a case, the estimation of the current position becomes unnecessary; thereby the load of the controller 11 can be reduced.

Thereafter, when the vehicle receives GPS radio waves after passing the tunnel and the tunnel exit OB, the current position acquired at the GPS receiver 12 is displayed, in the same manner as a case in which the vehicle passes the tunnel exit OA. In a case in which the current position is not acquired immediately, the current position mark N may be displayed at a position just ahead of the tunnel exit OB.

As described above, according to the navigation device in the present embodiment, in a case in which GPS radio waves are not received even when the vehicle travels for more than the distance La which is a shorter distance to the tunnel exit after passing the branch P in the tunnel, it is possible to determine the other road B as the road currently being traveled.

Thereby, the road currently being traveled can be informed to the user by map display and/or audio on the navigation device.

In addition, upon determining the road B, it is possible to resume, in the tunnel, the guidance suspended at the branch B by displaying the current position mark N at a preliminary position Nb (estimated current position) on the determined road B. Namely, the user can receive guidance using the current position mark N even in the tunnel.

Hereinbefore, an exemplary embodiment of the terminal device is described.

For example, in the embodiment described above, a case is exemplified, in which, as the guidance corresponding to the current position, the map corresponding to the current position is displayed on the display part 19 and the current position mark is displayed on the map corresponding to the detected current position. However, regarding the contents of the guidance, other methods which are conventionally implemented as navigation functions may be utilized.

For example, the guidance on the travel direction may be performed by audio. In addition, in a case in which a travel route to a destination calculated by a host device or a navigation server is already acquired, the road corresponding to the travel route on the map data may be distinguishably displayed (in a color different from others, flashing display, display in a different color density) as the guidance along a travel route.

In addition, in case of guidance by audio, guidance on the travel route after a branch may be provided just before entering a tunnel. In a case in which the travel route is not acquired, guidance such as "There is a branch at XXm in the tunnel. The left direction is toward AA. The left direction is toward BB." etc. may be provided. In a case in which the travel route has been acquired, "To the right/left direction at the branch at XXm in the tunnel," etc. may be provided.

In addition to the detailed guidance as described above, the contents of the guidance may be displaying the map data corresponding to the acquired/estimated current position on the display part 19.

In the embodiment described above, the area in a tunnel is exemplified as a blocking area. However, the blocking area is not limited to tunnels. Broad areas in which GPS radio waves are not receivable may be included in the blocking area.

For example, areas under elevated structures such as under urban highways, areas in the vicinity of specific structures may be included in the blocking area. In a case in which, in addition to tunnels, these areas are included in the blocking area, unknown areas are actually researched, put into data, and utilized.

These blocking areas are also associated with road data and put into data, in the same manner as tunnel data. For example, the blocking areas are designated by link numbers of road data and/or intersection data indicating intersections.

In addition, in the embodiment described above, a case is exemplified, in which the navigation device 1 (terminal device) acquires vehicle speed data from the vehicle. However, there are vehicles that are not configured to output the vehicle speeds or terminal devices that are not capable of acquiring the vehicle speeds outputted by the vehicles.

In such cases, the terminal devices may acquire a legal speed of the road identified on the basis of the current position that is acquired before entering a blocking area (just before GPS radio waves becomes unreceivable). As an alternative method of acquiring the speed, the vehicle speed for each road may be put into data by measuring the vehicle speed of the vehicle traveling on each road in blocking areas and/or acquiring information from probe cars, and utilized.

In a case in which a vehicle speed on the basis of the legal speed of each road or in data is utilized, the accuracy of the movement distance in the blocking area and the estimated current position is lowered, compared to a case in which the vehicle speed actually measured from the vehicle is acquired. Therefore, an error amount Ly due to the vehicle speed may be included, in the same manner as a case in which the distance Lx which ensures the reception of GPS radio waves is included in the shortest leaving distance Ls. In such a case, it may be configured to increase the error amount Ly as the distance to the exit increases.

In the embodiment described above, the movement distance itself is utilized as the physical amount that is convertible to a movement distance and the shortest leaving physical amount. However, a movement time in a tunnel may be utilized.

In a case in which a movement time is utilized as the physical amount and the shortest leaving physical amount, a shortest leaving time Ts corresponding to the vehicle speed acquired from the vehicle, the legal speed of each road or the vehicle speed in the data that are described above is acquired. However, the shortest leaving time Ts that is previously calculated on the basis of the distance (total value of link length) of each road stipulated in the road data may be stored in the database and the shortest leaving time Ts may be acquired from the database.

In addition, the physical amount (movement time Tm) that is convertible to the movement distance is measured using the clock 15. In a case in which the shortest leaving time Ts is a time having a reference point at the branch P, the time measured using the branch as the reference point is utilized as the movement time Tm. On the other hand, in a case in which the shortest leaving time Ts is a time having a reference point at the tunnel entrance I, the time measured using the tunnel entrance I as the reference point is utilized as the movement time Tm.

In addition, when acquiring the physical amount and the shortest leaving physical amount (movement distance, movement time), in a case in which the legal speed of each road or the vehicle speed in the data that are described above is utilized instead of the vehicle speed from the vehicle, it is supposed that a large error may be generated in case of congestion, which may cause an error determination.

Therefore, a receiver that acquires congestion information supplied from a VICS (Vehicle Information and Communication System: registered trademark) may be provided. Then, in a case in which the receiver acquires the congestion information indicating that the blocking area in a target tunnel etc. is congested, the guidance in the tunnel may continue suspended until GPS radio waves are received.

DESCRIPTION OF THE REFERENCE NUMERALS

1: NAVIGATION DEVICE (TERMINAL DEVICE)
2: NETWORK
3: NAVIGATION SERVER
4: IN-VEHICLE LAN
11: CONTROLLER
12: GPS RECEIVER
13: EXTERNAL CONNECTION INTERFACE
14: COMMUNICATION CONTROLLER
15: CLOCK
16: PROGRAM STORING PART
17: DATA RECORDING PART
18: OPERATION INPUT PART
19: DISPLAY PART
20: AUDIO OUTPUT PART

The invention claimed is:
1. A terminal device that provides guidance corresponding to a current position on map data, characterized by comprising:
map data storage for storing the map data;
current position acquiring module for receiving radio waves from GPS satellites and acquiring a current position on the map data;

blocking area acquiring module for acquiring a blocking area in which radio waves from the GPS satellites are not receivable, the blocking area corresponding to the map data;

guidance module for providing guidance corresponding to the current position, and in a case in which the terminal device is moving on a road in the blocking area and the road has a branch, suspends the guidance corresponding to the current position;

physical amount estimating module for estimating a physical amount in the blocking area, the physical amount being convertible to a movement distance; and movement road determining module for determining a road on which the terminal device is moving after the branch in the blocking area, on the basis of the estimated physical amount and whether or not the radio waves from the GPS satellites are received, wherein after the road on which the terminal device is moving after the branch is determined by the movement road determining module, the guidance module terminates the guidance suspension and provides guidance on the road on which the terminal device is moving after the branch.

2. The terminal device according to claim 1, the guidance module, in a case in which radio waves from the GPS satellites are received during the guidance being suspended, terminates the guidance suspension and resumes the guidance corresponding to the acquired current position.

3. The terminal device according to claim 2, further comprising a shortest leaving physical amount acquiring module for acquiring a shortest leaving physical amount to leaving, with respect to a shortest road through which the terminal device leaves the blocking area fastest in a case in which the terminal device travels on each road ahead of the branch, wherein the movement road determining module, in a case in which the estimated physical amount exceeds the shortest leaving physical amount and radio waves from the GPS satellites are not received, determines a road that is not the shortest road as the road on which the terminal device is traveling after the branch.

4. The terminal device according claim 3, wherein the guidance module terminates the guidance suspension, estimates as the current position a position that is on the determined road and corresponds to the estimated physical amount, and provides guidance corresponding to the estimated current position.

5. The terminal device according to claim 3, wherein the terminal device is installed in a vehicle, the blocking area acquiring module acquires an area in a tunnel as the blocking area, the physical amount estimating module estimates a movement distance as a physical amount in the blocking area, and the shortest leaving physical amount acquiring module acquires a shortest leaving distance to an exit of the tunnel as the shortest leaving physical amount.

6. The terminal device according to claim 5, further comprising a vehicle speed acquiring device for acquiring a vehicle speed from the vehicle, wherein the physical amount estimating module estimates the movement distance on the basis of the vehicle speed acquired from the vehicle and a movement time in the tunnel.

7. The terminal device according to claim 3, t wherein the terminal device is installed in a vehicle, and the blocking area acquiring module acquires an area in a tunnel as the blocking area and includes a prescribed vehicle speed acquiring device for acquiring a prescribed vehicle speed that is previously prescribed for the tunnel, the physical amount estimating module acquires a movement time in the tunnel as the physical amount, and the shortest leaving physical amount acquiring module acquires a shortest leaving time to an exit of the tunnel on the basis of the acquired prescribed vehicle speed as the shortest leaving physical amount.

8. The terminal device according to claim 7, further comprising a congestion information acquiring module for acquiring congestion information, wherein the guidance module continues the guidance suspension in the tunnel in a case in which congestion information in the tunnel is acquired.

9. The terminal device according to claim 2, wherein the guidance module terminates the guidance suspension, estimates as the current position a position that is on the determined road and corresponds to the estimated physical amount, and provides guidance corresponding to the estimated current position.

10. The terminal device according to claim 1, including shortest leaving physical amount acquiring module for acquiring a shortest leaving physical amount to leaving, with respect to a shortest road through which the terminal device leaves the blocking area fastest in a case in which the terminal device travels on each road ahead of the branch, wherein the movement road determining module, in a case in which the estimated physical amount exceeds the shortest leaving physical amount and radio waves from the GPS satellites are not received, determines a road that is not the shortest road as the road on which the terminal device is traveling after the branch.

11. The terminal device according to claim 10, wherein t the terminal device is installed in a vehicle, the blocking area acquiring module acquires an area in a tunnel as the blocking area, the physical amount estimating module estimates a movement distance as a physical amount in the blocking area, and the shortest leaving physical module acquiring means acquires a shortest leaving distance to an exit of the tunnel as the shortest leaving physical amount.

12. The terminal device according to claim 11, characterized by comprising vehicle speed acquiring means for acquiring a vehicle speed from the vehicle, wherein the physical amount estimating means estimates the movement distance on the basis of the vehicle speed acquired from the vehicle and a movement time in the tunnel.

13. The terminal device according to claim 10, wherein the terminal device is installed in a vehicle, and the blocking area acquiring module acquires an area in a tunnel as the blocking area and includes a prescribed vehicle speed acquiring module for acquiring a prescribed vehicle speed that is previously prescribed for the tunnel, the physical amount estimating module acquires a movement time in the tunnel as the physical amount, and the shortest leaving physical amount acquiring module acquires a shortest leaving time to an exit of the tunnel on the basis of the acquired prescribed vehicle speed as the shortest leaving physical amount.

14. The terminal device according to claim 13, further comprising a congestion information acquiring module for acquiring congestion information, wherein the guidance module continues the guidance suspension in the tunnel in a case in which congestion information in the tunnel is acquired.

15. The terminal device according to claim 10, wherein the guidance module terminates the guidance suspension, estimates as the current position a position that is on the determined road and corresponds to the estimated physical amount, and provides guidance corresponding to the estimated current position.

16. The terminal device according to claim 15, wherein the terminal device is installed in a vehicle,
the blocking area acquiring module acquires an area in a tunnel as the blocking area,
the physical amount estimating module estimates a movement distance as a physical amount in the blocking area, and
the shortest leaving physical amount acquiring module acquires a shortest leaving distance to an exit of the tunnel as the shortest leaving physical amount.

17. The terminal device according to claim 16, further comprising a vehicle speed acquiring device for acquiring a vehicle speed from the vehicle, wherein
the physical amount estimating module estimates the movement distance on the basis of the vehicle speed acquired from the vehicle and a movement time in the tunnel.

18. The terminal device according to claim 1, the guidance module terminates the guidance suspension, estimates as the current position a position that is on the determined road and corresponds to the estimated physical amount, and provides guidance corresponding to the estimated current position.

19. A guidance program on a non-transitory computer-readable storage medium for a terminal device that provides guidance corresponding to a current position on map data, the guidance program operable for causing a computer to execute:
current position acquiring function of receiving radio waves from GPS satellites and acquiring the current position on the map data;
blocking area acquiring function of acquiring a blocking area in which radio waves from the GPS satellites are not receivable, the blocking area corresponding to the map data;
guidance function of providing guidance corresponding to the current position, and in a case in which the terminal device is moving on a road in the blocking area and the road has a branch, suspending the guidance corresponding to the current position;
physical amount estimating function of estimating a physical amount in the blocking area, the physical amount being convertible to a movement distance; and
movement road determining function of determining a road on which the terminal device is moving after the branch in the blocking area, on the basis of the estimated physical amount and whether or not the radio waves from the GPS satellites are received,
the guidance function of terminating the guidance suspension and providing guidance on the road on which the terminal device is moving after the branch after the road on which the terminal device is moving after the branch is determined using the movement road determining function.

* * * * *